United States Patent [19]
Yamaoka et al.

[11] Patent Number: 5,115,892
[45] Date of Patent: May 26, 1992

[54] HYDRAULIC SHOCK ABSORBER WITH PISTON SEAL STRUCTURE FOR ENHANCEMENT OF INITIAL RESPONSE

[75] Inventors: Fumiyuki Yamaoka; Junichi Emura; Takayuki Furuya, all of Kanagawa, Japan

[73] Assignee: Atsugi Unisia Corporation, Japan

[21] Appl. No.: 412,499

[22] Filed: Sep. 26, 1989

[30] Foreign Application Priority Data

Sep. 27, 1988 [JP] Japan .................. 63-242042
Sep. 29, 1988 [JP] Japan .................. 63-245233

[51] Int. Cl.$^5$ .................... F16F 9/06; F16F 9/52
[52] U.S. Cl. ..................... 188/282; 188/317; 188/322.14; 188/322.15; 188/322.22; 188/322.17; 188/322.18; 188/315; 188/280
[58] Field of Search .......... 188/322.22, 322.15, 188/317, 322.14, 281, 282, 280, 322.13, 322.17, 322.18, 322.16, 320, 318, 315

[56] References Cited

U.S. PATENT DOCUMENTS

| | | | |
|---|---|---|---|
| 3,104,916 | 9/1963 | Dowling et al. | 188/322.17 X |
| 3,134,460 | 5/1964 | De Carbon | 188/322.15 X |
| 3,661,236 | 5/1972 | Wossner | 188/322.17 X |
| 3,791,495 | 12/1974 | Keijzer et al. | |
| 3,828,897 | 8/1974 | Nandyal | 188/322.18 X |
| 3,837,445 | 9/1974 | Pierle | 188/322.17 X |
| 4,724,937 | 2/1988 | Fannin et al. | 188/322.15 X |
| 4,747,475 | 5/1988 | Hagwood et al. | 188/322.15 |
| 4,809,828 | 3/1989 | Nakazato | 188/322.15 |
| 4,809,829 | 3/1989 | Hummel et al. | 188/322.15 |
| 4,821,850 | 4/1989 | Geiling et al. | 188/322.18 X |
| 4,821,852 | 4/1989 | Yokoya | 188/322.15 |
| 4,905,799 | 3/1990 | Yamaoka et al. | 188/282 X |
| 4,949,819 | 8/1990 | Beutel et al. | 188/322.17 |

FOREIGN PATENT DOCUMENTS

| | | |
|---|---|---|
| 22253 | 8/1978 | Australia . |
| 30584 | 5/1979 | Australia . |
| 58696 | 6/1981 | Australia . |
| 10852 | 12/1983 | Australia . |
| 0200446 | 11/1186 | European Pat. Off. . |
| 00174119 | 3/1986 | European Pat. Off. . |
| 0186324 | 7/1986 | European Pat. Off. . |
| 833574 | 2/1952 | Fed. Rep. of Germany . |
| 580959 | 9/1962 | Fed. Rep. of Germany . |
| 2031158 | 12/1971 | Fed. Rep. of Germany . |
| 7725888 | 12/1977 | Fed. Rep. of Germany . |
| 2922437 | 12/1980 | Fed. Rep. of Germany . |
| 24846 | 2/1986 | Japan .................. 188/322.18 |
| 618797 | 2/1949 | United Kingdom ........ 188/282 |
| 938458 | 10/1963 | United Kingdom . |
| 1039003 | 8/1966 | United Kingdom . |
| 1581971 | 12/1980 | United Kingdom . |
| 2050559 | 1/1981 | United Kingdom . |

Primary Examiner—Douglas C. Butler
Attorney, Agent, or Firm—Ronald P. Kananen

[57] ABSTRACT

A shock absorber employs a seal structure which can sucessfully prevent a working fluid from causing leak flow for enhanced variation characteristics of damping force. The seal structure includes a seamless seal member applied on a piston and/or on an inner periphery of a piston rod guide member.

12 Claims, 7 Drawing Sheets

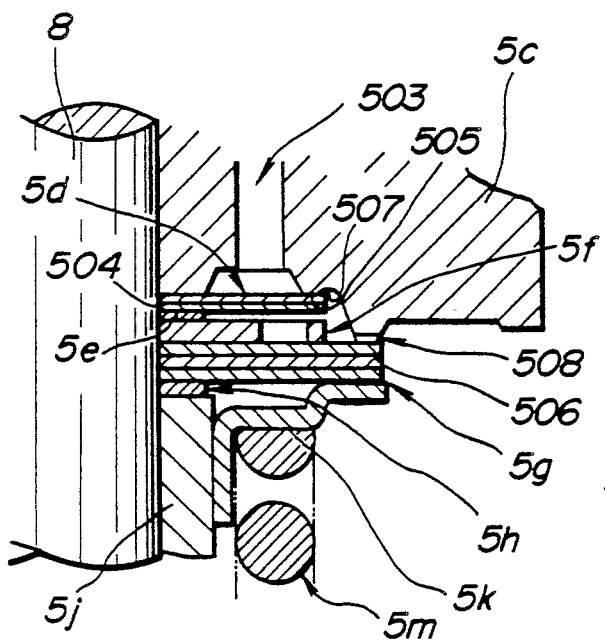
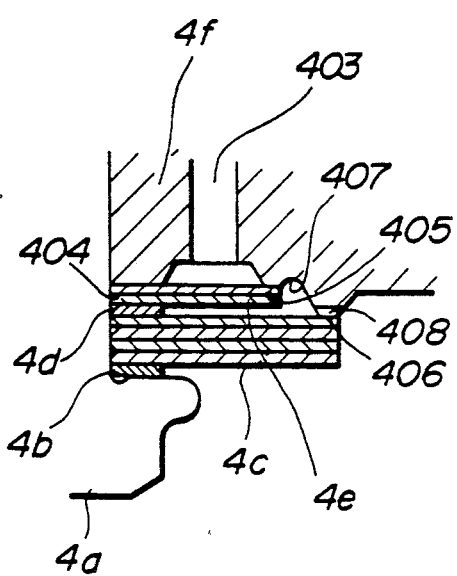
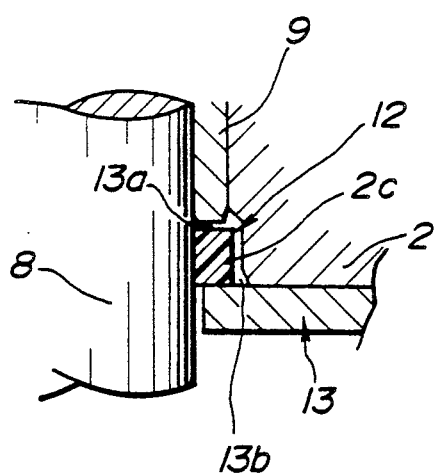
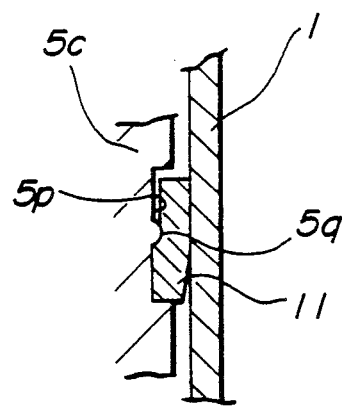

FIG.12  FIG.13(A)  FIG.14(A)
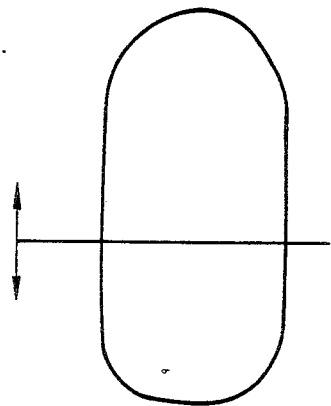 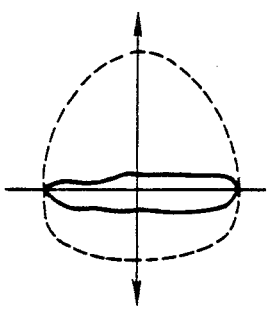 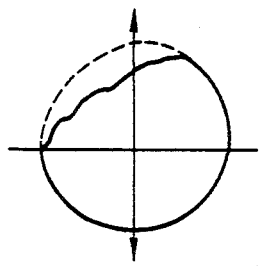
FIG.13(B)  FIG.14(B)
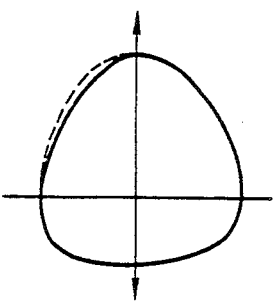 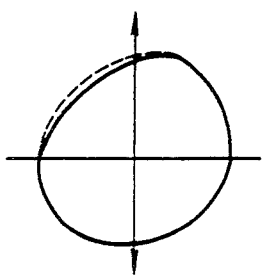
FIG.13(C)  FIG.14(C)
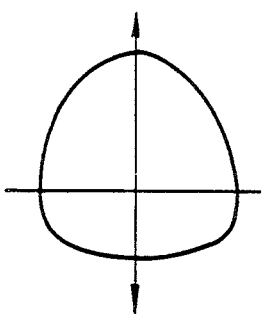 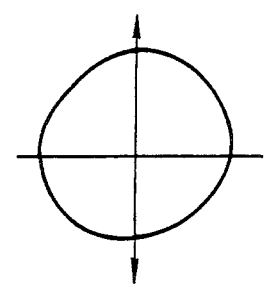

HYDRAULIC SHOCK ABSORBER WITH PISTON SEAL STRUCTURE FOR ENHANCEMENT OF INITIAL RESPONSE

BACKGROUND OF THE INVENTION

1. Field of the Invention

The present invention relates generally to a hydraulic shock absorber, suitable for use in an automotive suspension system. More specifically, the invention relates to a hydraulic shock absorber which can provide enhanced initial response characteristics.

2. Prior Art

Japanese Patent First (unexamined) Publication (Tokkai) Showa 56-119035 discloses one of the typical constructions of shock absorbers which employs a disc valve for resiliently closing the opening end of an essentially axial fluid path defined through a piston. The shock absorber is also provided with a constant orifice through which a working fluid is constantly permitted to flow. The constant orifice is designed for generating damping force at relatively low piston speed range. Namely, in a relatively low piston speed range, the disc valve is held in closed position for blocking fluid communication therethrough because of relatively small pressure difference between upper and lower fluid chambers defined across the piston. In such piston speed range, the constant orifice is only effective for permitting fluid flow and thus for generating damping force by its flow restriction effect. On the other hand, when the piston stroke speed is increased in excess of a critical speed at which the pressure difference between the upper and lower cylinder overcomes the resilient force of the disc valve, the disc valve opens to permit a greater amount of working fluid to flow therethrough. In such a construction substantial variation of the damping characteristics is caused by the transition between a low piston speed range and a high piston speed range changing across a critical speed set forth above.

In order to obtain optimum damping characteristics, it is desirable to provide essentially linear variation characteristics of damping force over all piston speed ranges. For this purpose, it is desirable not to provide a constant orifice so as to provide lineality in variation of the damping characteristics. Furthermore, as discussed in German Patent 833,574, it is preferable to provide damping force variation characteristics proportional in approximately two thirds the power of the piston stroke speed ($S^{(\frac{2}{3})}$: S is piston stroke speed).

Although a certain level of improvement can obtained by removing the constant orifice, it is still not satisfactory for providing satisfactory response characteristics in the generation of the damping force. Particularly, at the initial stage of generating damping force, lack of damping force can be caused by leak flow of the working fluid between the upper and lower working chambers through a small gap defined between the piston and the inner periphery of a shock absorber cylinder or between the upper working chamber and a reservoir chamber through a gap between a piston rod and a guide structure therefor.

SUMMARY OF THE INVENTION

Therefore, it is an object of the present invention to provide a shock absorber which can improve the shortcoming in the conventional art and thus provide enhanced variation characteristics of the damping force.

In order to accomplish the aforementioned and other objects, a shock absorber, according to the present invention, employs a seal structure which can successfully prevent a working fluid from causing leak flow for enhanced variation characteristics of damping force. The seal structure includes a seamless seal member applied on a piston and/or on an inner periphery of a piston rod guide member.

According to one aspect of the invention, a shock absorber comprises:

a hollow cylinder filled with a working fluid;

a piston mounted on one end of a piston rod and thrustingly movable within the hollow cylinder, said piston dividing the interior space of said cylinder into first and second chambers;

a fluid path means for establishing fluid communication between said first and second fluid chambers;

a flow restriction valve means associated with said fluid path means for restricting flow therethrough for generating damping force, said flow restriction valve means being so designed as to establish essentially linear variation characteristics of damping force depending upon piston stroke speed; and a seal member disposed between the outer periphery of said piston and the inner periphery of said cylinder for establishing a fluid tight seal therebetween, said seal member being formed of a material having a lubricating ability and sealing ability and into a seamless structure.

The cylinder may have an open end which is closed by a closure member, said piston extends through a through opening formed through said closure member for external connection, and a seal ring is disposed between the outer periphery of said piston rod and the inner periphery of said through opening of said closure member for establishing a fluid tight seal, said seal ring being formed of a material having lubricating ability and sealing ability and into a seamless structure. The flow restriction valve means may comprise a first valve means responsive to a piston stroke for generating a first damping force variable according to a first variation characteristic in relation to variation of the piston stroke speed, and a second valve means responsive to the piston stroke for generating a second damping force variation according to a second variation characteristic in relation to variation of the piston stroke speed.

In the preferred construction, a first valve means comprises a first window opening defined on said said piston and communicating with said fluid path, said window opening being surrounded by a first land having a first surface, and a first resilient valve means resiliently biased toward said surface for normally establishing sealing contact with said first surface and responsive to fluid flow in a first flow direction generated by the piston stroke in said one stroke direction for forming a first flow restrictive path for fluid communication from said first window opening and one of said first and second fluid chambers for generating said first damping force, and a second window opening formed on said piston in fluid communication with said first window opening, said second window opening being defined by a second land with a second surface, and a second resilient valve means resiliently biased toward said second surface for normally establishing sealing contact with said second surface and responsive to fluid flow in a first flow direction generated by the piston stroke in said one stroke direction for forming a second flow restrictive path for fluid communication between said first and second window openings for generating said second damping force. The first and second damping force generating means are oriented in tandem fashion with respect to said fluid flow so that said first and second damping force generating means are cooperative for generating said active damping force. The first valve means is provided with variation characteristics for providing greater damping force variation rate at low piston speed ranges, and said second valve means is provided variation characteristics for providing greater damping force variation rate at intermediate and high piston stroke speed ranges.

The shock absorber may further comprise a second valve means provided for generating damping force in response to a fluid flow in a second direction opposite to said first direction, said second valve means being so designed as to establish essentially linear variation characteristics of damping force depending upon piston stroke speed.

According to another aspect of the invention, a shock absorber comprises:

a hollow cylinder filled with a working fluid;

a piston mounted on one end of a piston rod and being thrustingly movable within the hollow cylinder, said piston dividing the interior space of said cylinder into first and second chambers;

a fluid path means for establishing fluid communication between said first and second fluid chambers;

a flow restriction valve means associated with said fluid path means for restricting fluid flow therethrough for generating damping force, said flow restriction valve means being so designed as to establish essentially linear variation characteristics of damping force depending upon piston stroke speed;

a closure member closing one end of said cylinder and defining therethrough a through opening, through which said piston rod extends for external connection; and a seal ring is disposed between the outer periphery of said piston rod and the inner periphery of said through opening of said closure member for establishing a fluid tight seal, said seal ring being formed of a material having lubricating ability and sealing ability and into a seamless structure.

According to a further aspect of the invention, a shock absorber comprises:

inner and outer hollow cylinders coaxially arranged for defining therebetween an annular reservoir chamber, and said inner cylinder defining an interior space filled with a working fluid, and said fluid reservoir chamber being filled with hydraulic fluid and gaseous fluid;

a piston mounted on one end of a piston rod and thrustingly movable within the hollow inner cylinder, said piston dividing the interior space of said inner cylinder into first upper and second lower chambers;

a hydraulic fluid path means for establishing hydraulic fluid communication between said first and second hydraulic fluid chambers;

a flow restriction valve means associated with said hydraulic fluid path means for restricting fluid flow therethrough for generating damping force, said flow restriction valve means being so designed as to establish essentially linear variation characteristics of damping force depending upon piston stroke speed;

a closure member closing one end of said inner cylinder and defining therethrough a through opening, through which said piston rod extends for external connection; and a communication path means for establishing fluid communication between said first upper fluid chamber and said fluid reservoir chamber across said closure member; and a seal structure associated with said communication path means for resiliently blocking fluid communication between said first upper fluid chamber and said fluid reservoir chamber.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 2 is an enlarged section of the major part of a piston employed in the preferred embodiment of the shock absorber of FIG. 1, which is the detail in the encircled portion A in FIG. 1;

FIG. 3 is an enlarged section of the major part of a bottom valve employed in the preferred embodiment of the shock absorber of FIG. 1, which illustrates detailed construction of the encircled portion B in FIG. 1;

FIG. 4 is an enlarged section of the piston at the encircled portion C in FIG. 1;

FIG. 5 is an enlarged section of a guide structure at the encircled portion D in FIG. 1;

FIGS. 6(A), 6(B) and 6(C) are graphs showing damping characteristics in the piston, in which FIG. 6(A) shows damping characteristics of a first stage valve, FIG. 6(B) shows damping characteristics of a second stage valve, and FIG. 6(C) shows damping characteristics of a secondary orifice;

FIG. 12 is a graph showing damping characteristics in a first damping cycle of the embodiment of FIG. 1 after leaving at static state for a long period;

FIGS. 13(A), 13(B) and 13(C) and; 14(A), 14(B) and 14(C) are graphs showing damping characteristics of the shock absorber in the prior art.

DESCRIPTION OF THE PREFERRED EMBODIMENT

Figure 1:
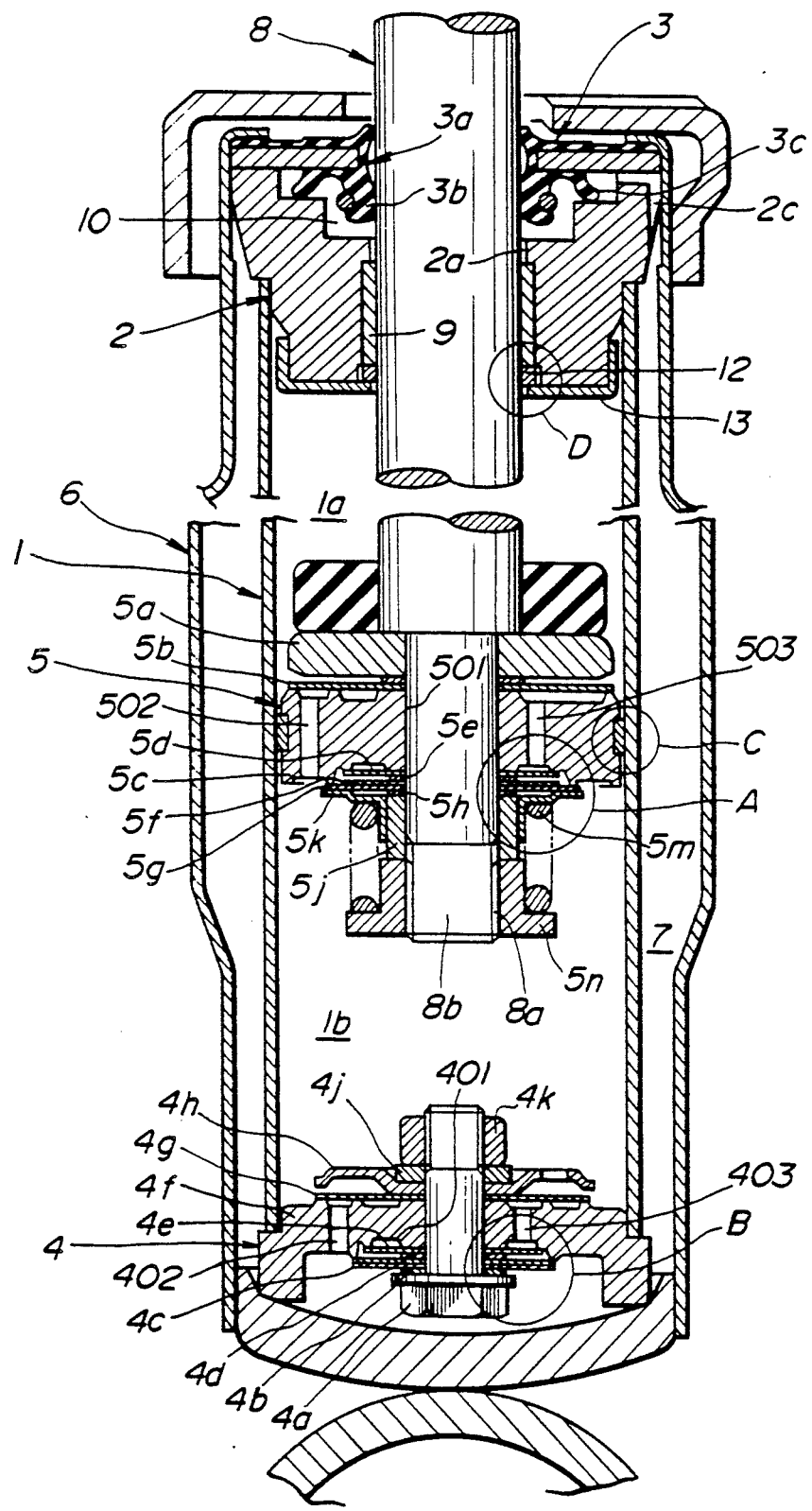
FIG. 1 is a section of the preferred embodiment of a shock absorber according to the present invention.

Referring now to the drawings, particularly to FIG. 1, the preferred embodiment of a hydraulic shock absorber, according to the present invention, employs a double action structure including an inner and outer cylinders 1 and 6. The top end of the inner cylinder 1 is closed by a guide member 2 and a seal member 3. On the other hand, the bottom end is closed by a bottom fitting assembly 4. Therefore, the inner cylinder 1 defines an enclosed space filled with a working fluid. A piston assembly 5 is disposed within the enclosed space of the inner cylinder 1 for thrusting movement therein and dividing the enclosed space into upper and low fluid chambers 1a and 1b. On the other hand, an annular reservoir chamber 7 is filled with a working fluid and working gas.

The piston assembly 5 is mounted on the lower end of a piston rod 8 for thrusting movement therewith. The piston assembly 5 comprises a retainer 5a, a check plate 5b, a piston body 5c, a first stage disc valve 5d, a washer 5e, a stopper plate 5f, a second stage disc valve 5g, a washer 5h, a collar 5j, a spring seat 5k and an assist spring 5m. These components are gathered at the smaller diameter section 8b of the piston rod 8 and are firmly secured to the lower end by means of a fastening nut 5n which engages with a threaded portion 8a of the small diameter section 8b of the piston rod.

The piston body 5c defines a through opening 502 oriented in the vicinity of the outer circumference thereof. The through opening 502 may be hereafter referred to as the "outer axial opening". The piston body 5c also defines a through opening 503 oriented at an orientation close to a center opening 501 which receives the small diameter section 8b of the piston rod 8. The opening 503 will be hereafter referred to as the "inner axial opening". The upper end of the outer axial opening 502 is openably closed by means of the check plate 5b. The check plate 5b blocks fluid flow from the upper fluid chamber 1a to the lower fluid chamber 1b. On the other hand, the check plate 5b is in communication with the fluid pressure in the lower fluid chamber 1b for permitting fluid flow through a gap formed by deformation of the check plate from the lower fluid chamber 1b to the upper fluid chamber 1a.

On the other hand, as shown in FIG. 2, the lower end of the inner axial opening 503 is closed by the first and second stage disc valves 5d and 5g. The first stage disc valve 5d is normally seated on inner and outer seat surfaces 504 and 505. Cross-sectionally essentially semi-circular groove 507 is formed adjacent the outer side seat surface 505. On the other hand, the second stage disc valve 5g is seated on annular seat surface 506 which is formed along the outer circumference of the piston body 5c. As can be seen from FIG. 2, the first stage disc valve 5d opposes the stopper plate 5f via the washer 5e. The circumferential edge of the washer 5e defines a region for support for the first stage disc valve 5d. The magnitude of deformation of the first disc valve 5d is limited by the stopper plate 5f so that the maximum deformation magnitude corresponds to the thickness of the washer 5e. Once the circumferential edge of the first disc valve 5d comes into contact with the stopper plate, the intermediate portion of the first disc valve is gradually deformed with progressively increased reaction force.

It should be appreciated that, in the shown embodiment, the first disc valve is provided with a relatively low spring constant so that it may react on substantially small pressure difference between the upper and lower fluid chambers 1a and 1b. Therefore, even at a very low piston speed, the first disc valve 5d is deformed for permitting a corresponding flow rate of fluid flow for generating damping force.

One or more constant orifices 508 are formed between the second disc valve 5g and the seat surface 506 to permit minimum fluid flow. The constant orifice 508 may not be effective at initial stage of the piston stroke until the first disc valve 5d is deformed at a given magnitude to establish a given fluid flow.

The second disc valve 5g is provided with a greater spring constant so as to provide greater resistance in deformation. The spring coefficient of the second disc valve 5g is so determined as to achieve linear variation of the damping force depending upon the piston stroke magnitude and piston stroke speed.

The bottom fitting is provided with a bottom valve assembly. The bottom valve assembly comprises outer and inner axial openings 402 and 403 defined through a body 4f of the fitting. The valve assembly also comprises a washer 4b, a second stage disc valve 4c, a washer 4d, a first stage disc valve 4e, a check plate 4g, a retainer 4h and a collar 4j. These components are gathered and secured onto the fitting body 4f by means of a fastening bolt 4a, for which fastening nut 4k is engaged. The upper end of the outer axial opening 402 is operably closed by the check plate 4g by seating onto seat surfaces defined on the upper surface of the fitting. Therefore, the fluid flow from the lower fluid chamber 1b to the reservoir chamber 7 is blocked and the fluid flow in the opposite direction is permitted.

On the other hand, as shown in FIG. 3, the first disc valve 4e openably closes the lower end of the inner axial opening 403 by seating onto the seat surfaces 404 and 405 respectively defined on the center boss section and an annular land extending circumferentially at the radially outer side of the inner axial opening 403. An essentially semi-circular groove 407 is formed immediately outside of the seat surface 405 and extends therealong. The second disc valve 4c is seated onto a seat surface 406 at the circumferential edge portion. One or more constant orifices 408 are formed through the seat surface 406 so as to provide constant fluid flow in minimum flow rate.

As can be seen from FIGS. 2 and 3, the bottom valve assembly operates substantially in the same manner as the valve assembly in the piston.

As shown in FIG. 5, the guide member 2 is formed with a center opening 2a for receiving the piston rod 8 so that the latter may thrustingly moves with respect to the inner cylinder 1. A guide bushing 9 is provided on the inner periphery of the center opening 2a for sealing contact with the outer periphery of the piston rod 8 for forming a leak-tight seal. Furthermore, an annular seal ring 12 is provided between the inner periphery of the guide member 2 and the outer periphery of the piston rod 8 for enhancing sealing performance. For higher sealing ability, the seal ring 12 is formed into a seamless structure.

The guide member 2 is formed with a stepped circular recess serving as a fluid receptacle chamber 10. The upper end of the fluid receptacle chamber 10 is closed by a seal structure 3. The guide member 2 is cooperative with the seat structure 3 for defining a communication path 2c for fluid communication between the upper fluid chamber 1a and a gas chamber defined in the reservoir chamber 7. The seal structure 3 includes a seal member 3a having a cylindrical section 3b fitted onto the outer periphery of the piston rod 8. The seal member 3a also has a sealing lip section 3c which restricts fluid or gas communication between the fluid receptacle chamber 10 and the gas chamber of the reservoir chamber 7.

The seal lip section 3c is particularly effective for preventing gas or hydraulic fluid flow between the fluid reservoir chamber 7 and the fluid receptacle chamber 10. Particularly, when the shock absorber is left in static state for relatively long period. Namely, when the shock absorber is maintained in the static state for a long period, gas in the fluid reservoir chamber can enter into the upper fluid chamber 1a via the fluid receptacle chamber. The seal lip section 3c of the shown embodiment is effective in preventing the gas from flowing into the upper fluid chamber. The effect of the seal lip section 3c can be seen from FIGS. 12, 13 and 14. Namely, in the case of the shown embodiment of the shock absorber, since no gas leakage into the upper fluid chamber is caused, normal damping characteristics of the shock absorber can be obtained from the first damping cycle. On the other hand, in the case of the conventional shock absorber which has constant orifice in the piston and do not have the seal lip in the seal structure, the conventional shock absorber shows abnormal damping characteristics for the first several damping cycles after a leaving the shock absorber at static state. FIGS. 13(A), 13(B) and 13(C) respectively show the damping characteristics at the very first damping cycle, after 30 sec. from starting vibration and after 1 min. after the starting vibration. In the experiments of FIG. 13, the conventional construction of a shock absorber having a constant orifice in the piston and having no seal lip section in the seal structure was used. On the other hand, FIGS. 14(A), 14(B) and 14(C) show the results of experiments at the same timing of FIG. 13 and performed by utilizing a shock absorber which has the seal lip section in the seal structure and has constant orifice in the piston.

As can be seen herefrom, the shown embodiment of the shock absorber can provide a much higher and steady damping characteristics even after leaving the static state for a long period.

In the preferred embodiment, a piston ring 11 is fitted onto the outer periphery of the piston body 5c. The piston ring 11 is in slidingly contact with the inner periphery of the inner cylinder 1 for establishing a leak tight seal. In order to obtain the optimal sealing performance, the piston ring 11 is formed in a seamless structure and made of polychlorotrifluoroethylene (Teflon; tradename) and other materials which have good lubricating ability and sealing ability. As shown in FIG. 4, the piston ring 11 is received within an annular groove 5p formed around the piston body 5c. A projection 5q is formed at the axial center portion of the groove 5p so that the piston ring 11 may pivotally move for assuring sealing contact with the inner periphery of the inner cylinder.

Likewise, the seal ring 12 is also formed of polychlorotrifluoroethylene so as to provide good lubricating ability and sealing ability. The seal ring 12 is received within a receptacle groove 13a defined by the guide member 2 and a cover plate 13 which is firmly fitted to the guide member. As seen from FIG. 5, the cross section of the seal ring 12 is formed smaller than the cross sectional area of the receptacle groove 13a so as to leave clearance 13b between the inner periphery of the guide member 2 and the outer end thereof. The clearance 13b is provided as a play for permitting tolerance of the piston rod 8 and the guide member 2 which may cause offset of the center.

The operation of the shown embodiment of the shock absorber will be discussed herebelow with respect to respective of rebounding and bounding mode operations.

In the piston bounding mode stroke, the piston assembly 5 moves upwardly relative to the inner cylinder 1 for compressing the volume of the upper fluid chamber 1a and expanding the volume of the lower fluid chamber 1b. By variation of volumes, a fluid pressure difference is generated so that the fluid pressure in the upper fluid chamber 1a becomes higher than the lower fluid chamber 1b. Therefore, fluid flow from the upper fluid chamber 1a to the lower fluid chamber 1b is generated. Furthermore, because of lowering of the fluid pressure in the lower fluid chamber 1b, the fluid pressure in the reservoir chamber 7 becomes higher than that in the lower fluid chamber 1b for causing fluid flow through the bottom valve assembly. Therefore, working fluid in the upper fluid chamber 1a and the reservoir chamber 7 flows into the lower fluid chamber 1b until the pressure balance between the upper and lower fluid chambers and the reservoir chamber is established.

Figure 6A:
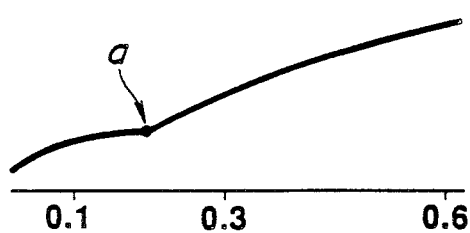
Figure 6B:
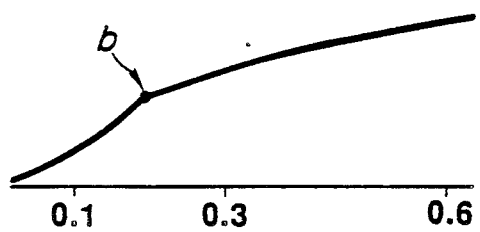
Figure 6C:
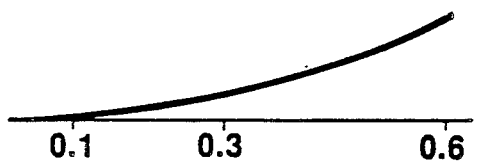

During the piston rebounding stroke, the working fluid in the upper fluid chamber 1a flows into the inner axial opening 503. Against the fluid flow, the first and second disc valves 5d and 5g are active for providing fluid flow restriction and thus generating damping force. FIGS. 6(A) and 6(B) show damping characteristics of respective of individual first and second stage disc valves 5d and 5g, in relation to the piston stroke speed. As can be seen from FIG. 6(A), the first stage disc valve 5d is normally in closed position for completely blocking fluid flow from the upper fluid chamber 1a to the lower fluid chamber 1b. The first stage disc valve 5d is responsive to even relatively small pressure difference to cause deformation for forming fluid flow orifice between the seat surface 506 to permit limited amount of fluid flow from the upper fluid chamber to the lower fluid chamber. As a result, damping force is created as shown in FIG. 6(A). As can be seen, at the initial stage of the piston stroke, the damping force is increased in proportion to the piston stroke speed S in a rate of two thirds the power of the piston speed ($S^{(\frac{2}{3})}$). The damping force generated by the first stage disc valve is much greater than that generated by the constant orifice in the prior art.

Figure 8:
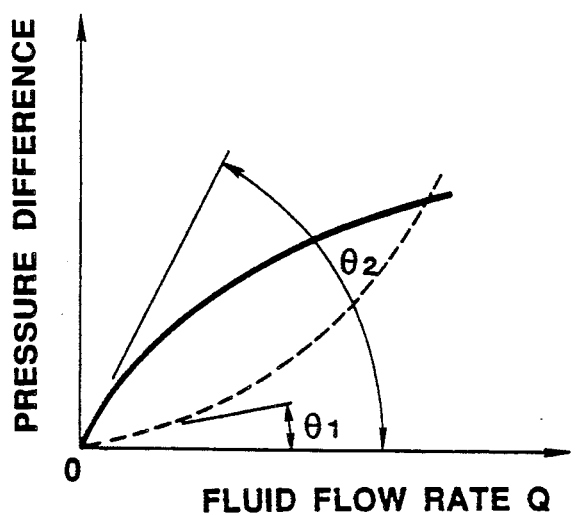
FIG. 8 is a graph showing pressure difference at the first stage valve.

When the circumferential edge of the first disc valve 5d comes into contact with the stopper plate 5f, the spring constant of the first disc valve becomes greater to vary the variation rate of the damping force to be greater rate. In FIG. 6(A), the point a where the variation characteristics of the damping force is changed, corresponds to the magnitude of the pressure difference at which the circumferential edge of the first disc valve comes into contact with stopper plate 5f. Further, FIG. 8 shows the variation of pressure difference at the initial stage of the piston stroke at relatively low piston stroke speed. In FIG. 8, the broken line shows the variation characteristics of the pressure difference versus the fluid flow rate Q in the conventional constant orifice, and the solid line shows variation characteristics of the pressure difference versus fluid flow rate in the first disc valve 5d. As can be seen by comparing two lines in FIG. 8, the conventional constant orifice provides variation characteristics of the pressure difference proportional to the second power of the fluid flow rate Q ($Q^2$). On the other hand, the variation characteristics of the pressure difference in the first disc valve of the invention is proportional to two thirds the power of the fluid flow rate ($Q^{(\frac{2}{3})}$). As seen, in the shown embodiment, relatively large damping force is generated at the very initial stage of the piston stroke.

On the other hand, FIG. 6(B) shows the variation characteristics of the damping force versus the piston stroke speed at the second stage disc valve 5g. As set forth above, the second stage disc valve 5g is held in a closed position at the low piston stroke range. At this condition, the working fluid flows through the constant orifices 508. As set forth above, in the low piston stroke speed range, since the only constant orifice 508 is effective for generating the damping force, the variation characteristics of the damping force in the low piston stroke range becomes substantially proportional to the second power of the piston stroke speed S ($S^2$). As is clear from FIG. 6(B), the damping force increasing rate at the second stage disc valve 5g is thus small in the low piston stroke speed range. After reaching the turning point b where the second stage disc valve 5g starts to open, the variation characteristics becomes substantially proportional to two thirds the power of the piston speed.

Figure 7:
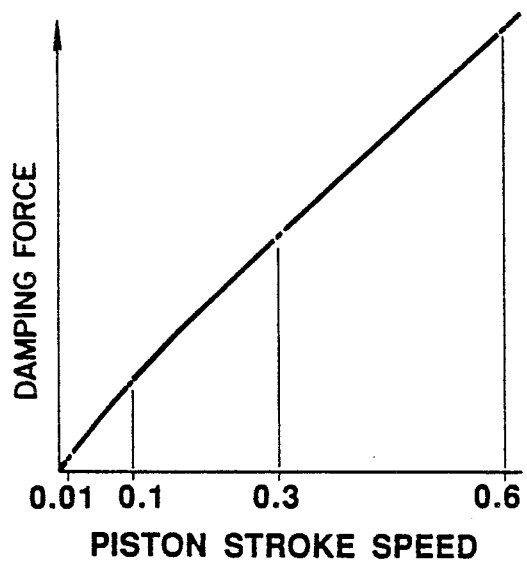
FIG. 7 is a graph showing damping characteristics of the preferred embodiment of the shock absorber of FIG. 1.

Therefore, by the combination of the first stage and second stage disc valves 5d and 5g, essentially linear variation characteristics as shown in FIG. 7 can be provided. Such lineality of the variation of the damping force provided by the preferred embodiment of the shock absorber is effective for obtaining better vehicular body attitude stabilization capacity when the shock absorber is applied as a component of the automotive suspension system, with satisfactorily high response. Particularly, the invention is particularly effective in damping relatively low speed piston stroke. Furthermore, according to the shown embodiment, since the variation characteristics of the damping force is essentially linear in the shown embodiment, high vehicular driving stability can be obtained.

Figure 9:
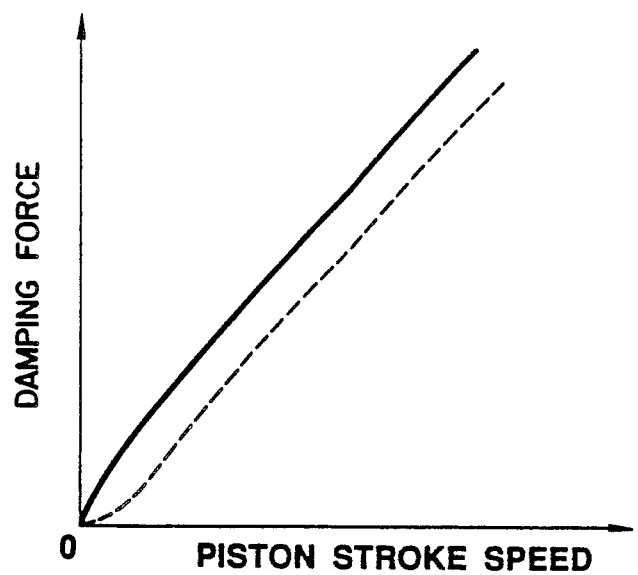
FIG. 9 is a graph showing variation of damping force at the initial stage of generation of damping force.

Furthermore, since the shown embodiment, employs the seamless piston ring 11 and the seal ring 12, leak flow of the working fluid from the upper fluid chamber 1a to the lower fluid chamber 1b via the gap between the periphery of the piston body 5f and the inner periphery of the inner cylinder, and to the fluid receptacle chamber 10 via the gap between the outer periphery of the piston rod 8 and the inner periphery of the guide member is reduced. Therefore, almost all of the working fluid flows through the inner axial opening 503. The effect of the seamless piston ring 11 and the seal ring 12 can be seen clearly from FIG. 9. In FIG. 9, the broken line shows the variation characteristics of the damping force when the piston ring and the seal ring in the shown embodiment are not employed, and the solid line shows the variation characteristics of the damping force in the shown embodiment. As can be seen from the broken line in FIG. 9, when the peripheries of the piston and the guide member are wet, is made easier to cause leak flow of the working fluid such as that provided by parallel constant orifices. Therefore, by the effect of this, the variation rate of the damping force at low piston stroke speed range is substantially or unacceptably small as shown in FIG. 9.

On the other hand, in the piston bounding stroke, the piston strokes with compressing the lower fluid chamber 1b to generate fluid pressure difference between the upper and lower fluid chambers and between the lower fluid chamber and the fluid reservoir chamber. As a result, fluid flow toward the upper fluid chamber 1a and toward the fluid reservoir chamber 7 from the flower fluid chamber 1b is generated. Then, the first and second stage disc valves 4f and 4c becomes effective for generating damping force varying according to generally linear characteristics as set forth with respect to the valve assembly of the piston.

During this piston bounding stroke, the piston ring 11 and the seal ring 12 are effectively for assuring leak tight seal for avoiding lowering of the damping force at the initial stage of the piston stroke.

Figure 10:
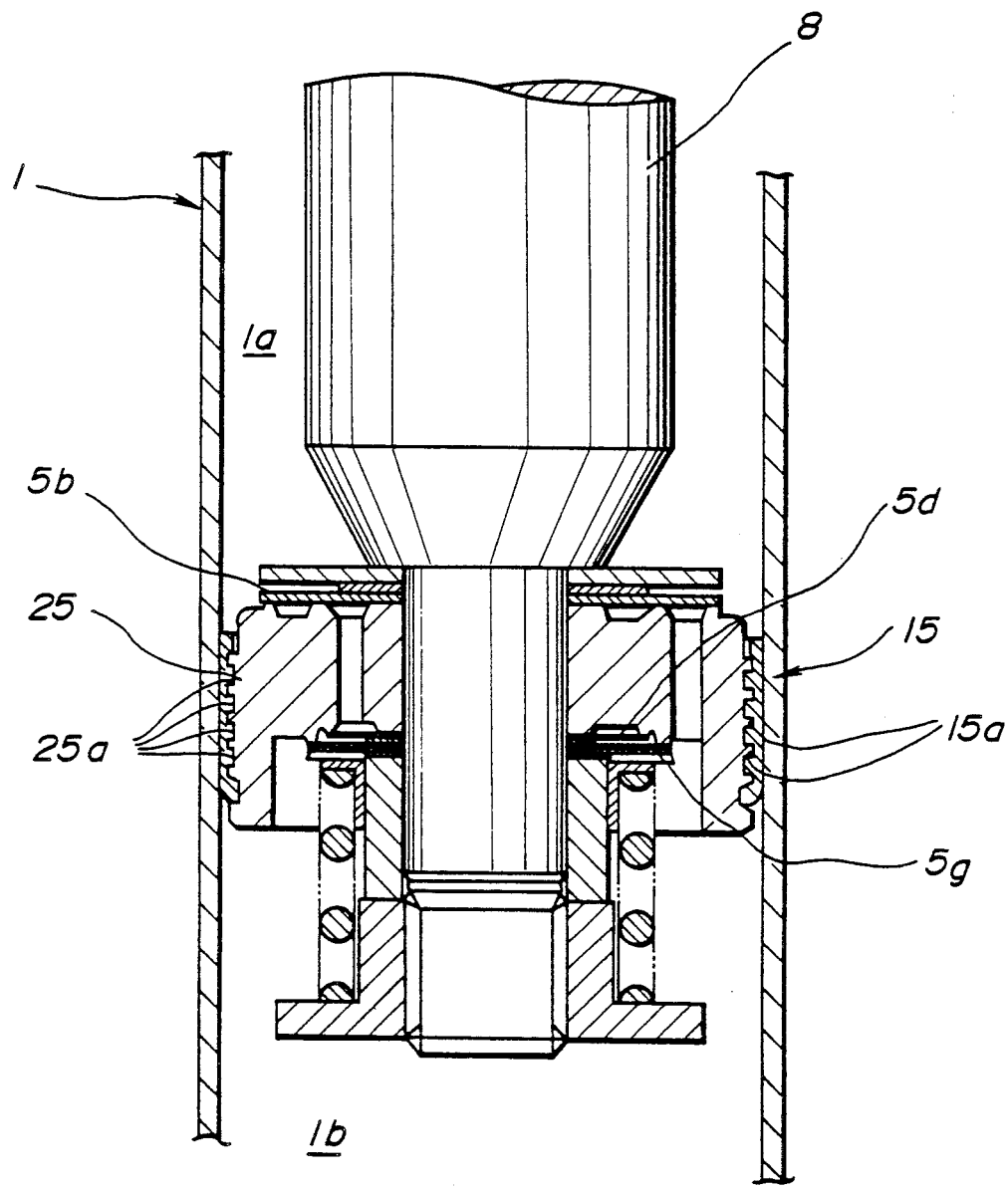
FIG. 10 is a section showing another embodiment of the shock absorber according to the present invention, in which is shown the structure of piston assembly employed in another embodiment of the shock absorber.
Figure 11:
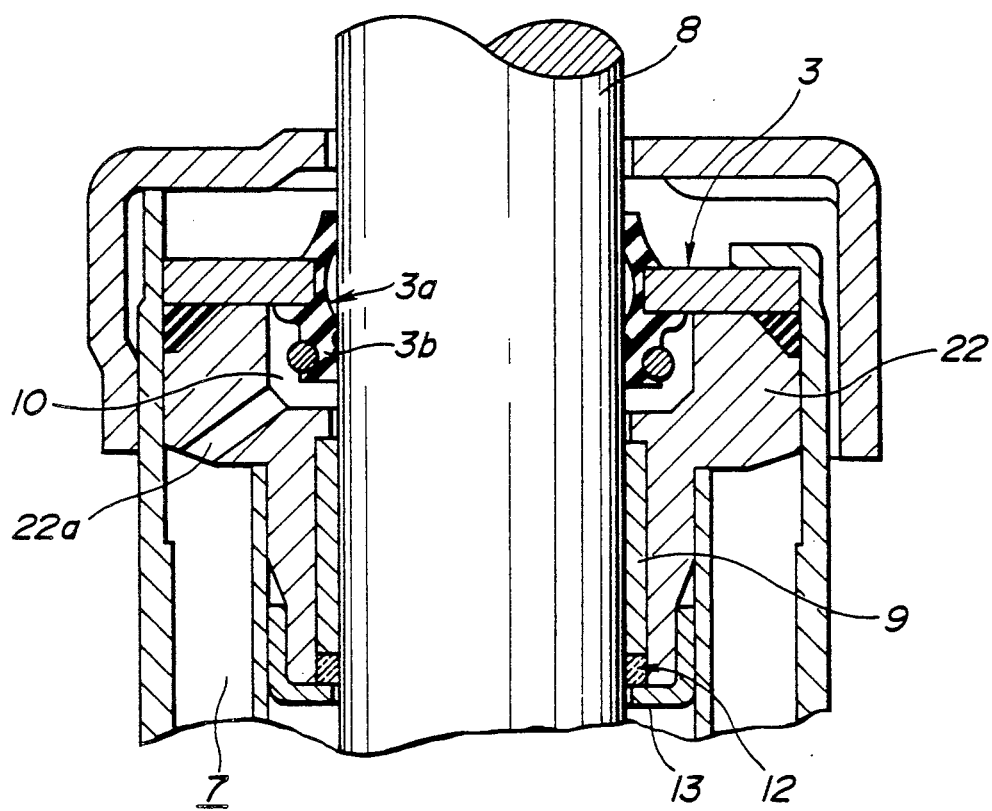
FIG. 11 is a section showing a guide structure for a piston rod employed in another embodiment of the shock absorber of FIG. 10.

FIG. 10 shows another embodiment of the shock absorber according to the present invention. In this embodiment, the configuration of the piston ring which is generally represented by the reference numeral 15, and the mounting structure thereof are differentiated from that in the former embodiment. The piston body as generally represented by the reference numeral 25 and the piston ring 15 are respectively provided notchings or a plurality of circumferentially extending grooves 25a and 15a with annular projections formed between adjacent grooves. The piston ring 15 is engaged onto the outer periphery of the piston body 25 by engaging the projections to the grooves 25a and 15a.

In the shown embodiment, the guide member which is generally represented by the reference numeral 22 is formed with a transverse path for establishing communication between the fluid receptacle chamber 10 and the fluid reservoir chamber 7. In this embodiment, substantially the same effects can be obtained as the former embodiment.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, the present invention may not only be applicable for the shown constructions of the shock absorbers but also applicable for any type of shock absorbers, such as those disclosed in European Patent First Publications 03 30 449, 03 36 756, 03 36 692 and 03 37 797.

What is claimed is:

1. A shock absorber comprising:
a hollow cylinder filled with a working fluid;
a piston mounted on one end of a piston rod and thrustingly movable within the hollow cylinder, said piston dividing the interior space of said cylinder into first and second chambers;
a fluid path means for establishing fluid communication between said first and second fluid chambers, said fluid path means generating a first damping force in response to piston stroke;
a first flow restricting valve means associated with said fluid path means for restricting fluid flow therethrough for generating a second damping force in response to piston stroke in one direction;
a second flow restricting value means associated with said fluid path means and arranged in series with said first valve means, for restricting fluid flow therethrough for generating a third damping force in response to piston stroke in said one direction, said flow path means and said first and second valve means being formed so that a composite damping force of said first, second and third damping forces has an essentially linear variation characteristic in relation to piston stroke speed; and a seal member disposed between the outer periphery of said piston and the inner periphery of said cylinder for establishing fluid tight sealing therebetween, said seal member assuring the essentially linear variation characteristic of said composite damping force.

2. A shock absorber as set forth in claim 1, wherein said cylinder has open end which is closed by a closure member, said piston rod extends through a through opening formed through said closure member for external connection, and a seal ring is disposed between the outer periphery of said piston rod and the inner periphery of said through opening of said closure member for establishing fluid tight seal, said seal ring being formed of a material having lubricating ability and sealing ability and into a seamless structure.

3. A shock absorber as set forth in claim 1, wherein said first valve means comprises a first window opening defined on said said piston and communicated with said fluid path, said window opening being surrounded by a first land having a first surface, and a first resilient valve means resiliently biased toward surface for normally establishing sealing contact with said first surface and responsive to fluid flow in a first flow direction generated by the piston stroke in said one stroke direction for forming a first flow restrictive path for fluid communication from said second window opening and one of said first and second fluid chambers for generating said first damping force and a second window opening formed on said piston in fluid communication with said first window opening, said second window opening being defined by a second land with a second surface, and a second resilient valve means resiliently biased toward said second surface for normally establishing sealing contact with said second surface and responsive to fluid flow in a first flow direction generated by the piston stroke in said one stroke direction for forming a second flow restrictive path for fluid communication between said first and second window opening for generating said third damping force.

4. A shock absorber as set forth in claim 3, wherein said second and third damping force generating means are oriented in tandem fashion with respect to said fluid flow.

5. A shock absorber as set forth in claim 4, wherein said first valve means is provided variation characteristics for providing greater damping force variation rate at low piston speed range, and said second valve means is provided variation characteristics for providing greater damping force variation rate at intermediate and high piston stroke speed range.

6. A shock absorber comprising:
a hollow cylinder filled with a working fluid;
a piston mounted on one end of a piston rod and thrustingly movable within the hollow cylinder, said piston dividing the interior space of said cylinder into first and second chambers;
a fluid path means for establishing fluid communication between said first and second fluid chambers, said fluid path means generating a first damping force in response to piston stroke;
a first flow restricting valve means associated with said fluid path means for restricting fluid flow therethrough for generating a second damping force in response to piston stroke in one direction;
a second flow restricting valve means associated with said fluid path means and arranged in series with said first valve means, for restricting fluid flow therethrough for generating a third damping force in response to piston stroke in said one direction, said flow path means and said first and second valve means being formed so that a composite damping force of said first, second and third damping forces has an essentially linear variation characteristic in relation to piston stroke speed;
a closure member closing one end of said cylinder and defining therethrough a through opening, through which said piston rod extends for external connection; and
a seal ring disposed between the outer periphery of said piston rod and the inner periphery of said through opening of said closure member for establishing fluid tight sealing therebetween, said seal ring assuring the essentially linear variation characteristic of said composite damping force.

7. A shock absorber as set forth in claim 6, which further comprises a seal member disposed between the outer periphery of said piston and the inner periphery of said cylinder for establishing fluid tight sealing therebetween, said seal member assuring the essentially linear variation characteristic of said composite damping force.

8. A shock absorber as set forth in claim 6, wherein said first valve means comprises a first window opening defined on said said piston and communicated with said fluid path, said window opening being surrounded by a first land having a first surface, and a first resilient valve means resiliently biased toward said surface for normally establishing sealing contact with said first surface and responsive to fluid flow in a first flow direction generated by the piston stroke in said one stroke direction for forming a first flow restrictive path for fluid communication from said window opening and one of said first and second fluid chambers for generating said second damping force, and a second window opening formed on said piston in fluid communication with said first window opening, said second window opening being defined by a second land with a second surface, and a second resilient valve means resiliently biased toward said second surface for normally establishing sealing contact with said second surface and responsive to fluid flow in a first flow direction generated by the piston stroke in said one stroke direction for forming a second flow restrictive path for fluid communication between said first and second window openings for generating said third damping force.

9. A shock absorber as set forth in claim 8, wherein said second and third damping force generating means are oriented in tandem fashion with respect to said fluid flow.

10. A shock absorber as set forth in claim 9, wherein said first valve means is provided variation characteristics for providing greater damping force variation rate at low piston speed range, and said second valve means is provided variation characteristics for providing greater damping force variation rate at intermediate and high piston stroke speed range.

11. A shock absorber comprising:
a hollow cylinder filled with a working fluid;
a piston mounted on one end of a piston rod and thrustingly movable within the hollow cylinder, said piston dividing the interior space of said cylinder into first and second chambers;
a fluid path means for establishing fluid communication between said first and second fluid chambers;

a flow restricting valve means associated with said fluid path means for restricting fluid flow therethrough for generating a damping force which has an essentially linear variation characteristic in relation to piston stroke; and a seal member disposed between the outer periphery of said piston and the inner periphery of said cylinder for establishing fluid tight sealing therebetween, said seal member assuring the essentially linear variation characteristic of said damping force.

12. A shock absorber comprising:

a hollow cylinder filled with a working fluid;

a piston mounted on one end of a piston rod and thrustingly movable within the hollow cylinder, said piston dividing the interior space of said cylinder into first and second chambers;

a fluid path means for establising fluid communication between said first and second fluid chambers;

a flow restricting valve means associated with said fluid path means for restricting fluid flow therethrough for generating a damping force which has an essentially linear variation characteristic in relation to piston stroke;

a closure member closing one end of said cylinder and defining therethrough a through opening, through which said piston rod extends for external connection; and a seal ring disposed between the outer periphery of said piston rod and the inner periphery of said through opening of said closure member for establishing fluid tight sealing therebetween, said seal ring assuring the essentially linear variation characteristic of said damping force.

* * * * *